United States Patent
Wintz et al.

(10) Patent No.: US 10,611,538 B2
(45) Date of Patent: Apr. 7, 2020

(54) ARTICLE FOR BUNDLING ITEMS TOGETHER

(71) Applicant: Bedford Industries, Inc., Worthington, MN (US)

(72) Inventors: Trevor Wintz, Round Lake, MN (US); David Schiller, Sioux Falls, SD (US)

(73) Assignee: Bedford Industries, Inc., Worthington, MN (US)

( * ) Notice: Subject to any disclaimer, the term of this patent is extended or adjusted under 35 U.S.C. 154(b) by 1075 days.

(21) Appl. No.: 14/776,061

(22) PCT Filed: Mar. 11, 2014

(86) PCT No.: PCT/US2014/023071
§ 371 (c)(1),
(2) Date: Sep. 14, 2015

(87) PCT Pub. No.: WO2014/150367
PCT Pub. Date: Sep. 25, 2014

(65) Prior Publication Data
US 2016/0031621 A1    Feb. 4, 2016

Related U.S. Application Data

(60) Provisional application No. 61/784,458, filed on Mar. 14, 2013.

(51) Int. Cl.
*B65D 71/50* (2006.01)
*B65B 13/02* (2006.01)
(Continued)

(52) U.S. Cl.
CPC .............. *B65D 71/50* (2013.01); *B65B 13/02* (2013.01); *B65D 23/003* (2013.01); *B65D 23/14* (2013.01); *B65D 25/205* (2013.01); *F16B 2/22* (2013.01)

(58) Field of Classification Search
CPC ...... B65D 71/50; B65D 25/205; B65D 23/14; B65D 23/003; F16B 2/22; B65B 13/02
(Continued)

(56) References Cited

U.S. PATENT DOCUMENTS 2,487,109 A * 11/1949 Deichert ................ B65D 71/50
217/19
2,520,203 A * 8/1950 Haywa ................... B65D 71/50
220/23.4
(Continued)

FOREIGN PATENT DOCUMENTS

EP    2039617 A1    3/2009
EP    2969832 A1    1/2016
(Continued)

OTHER PUBLICATIONS

Extended European Search Report dated Jun. 19, 2017 for European Application No. 17164868.6-1731.
(Continued)

*Primary Examiner* — Chelsea E Stinson
*Assistant Examiner* — Thomas M Wittenschlaeger
(74) *Attorney, Agent, or Firm* — Mai-Tram D. Lauer; Westman, Champlin & Koehler, P.A.

(57) ABSTRACT

A bundling article that includes a panel that defines panel apertures, and at least one elastomer element, where the at least one elastomer element is bonded to the panel and has non-bonded portions that overlay the panel apertures. The non-bonded portions of the at least one elastomer element define stretchable apertures having dimensions that are smaller than respective dimensions of the panel apertures.

15 Claims, 15 Drawing Sheets

(51) Int. Cl.
   *B65D 25/20*   (2006.01)
   *F16B 2/22*    (2006.01)
   *B65D 23/00*   (2006.01)
   *B65D 23/14*   (2006.01)

(58) Field of Classification Search
   USPC .......................... 206/147, 153, 158, 168, 156
   See application file for complete search history.

(56) References Cited

U.S. PATENT DOCUMENTS

| | | | | |
|---|---|---|---|---|
| 3,884,354 | A * | 5/1975 | Guenther | B65D 71/50 206/147 |
| 4,880,115 | A * | 11/1989 | Chaussadas | B65D 71/06 206/139 |
| 2003/0192788 | A1* | 10/2003 | Marco | B65D 71/08 206/147 |
| 2006/0118432 | A1* | 6/2006 | Weaver | B65D 71/504 206/150 |
| 2009/0101662 | A1* | 4/2009 | Marco | B65D 71/48 220/737 |
| 2010/0187256 | A1* | 7/2010 | Draisma | B65D 23/065 222/108 |
| 2016/0031621 | A1 | 2/2016 | Wintz et al. | |

FOREIGN PATENT DOCUMENTS

| | | |
|---|---|---|
| EP | 3222553 A1 | 9/2017 |
| WO | 96/00687 A1 | 1/1996 |
| WO | 2014150367 A1 | 9/2014 |

OTHER PUBLICATIONS

Further Examination Report dated Aug. 1, 2017 for New Zealand Application No. 710410.
Communication pursuant to Article 94(3) EPC in corresponding European Patent Application No. 14717270.4-1707 dated Aug. 17, 2016.
International Search Report dated Jun. 12, 2014, for PCT Application No. PCT/US2014/023071 (3 pages).
Examination Report dated Mar. 3, 2017 for Australian Application No. 2014237261.
First Examination Report dated Jan. 30, 2017 for New Zealand Application No. 710410.
Office Action dated Jun. 6, 2018 for Mexican patent Application No. MX/a/2015/011440.
Examination report dated Feb. 27, 2019 in corresponding European Patent Office patent application No. 17164868.6.
Canadian Office Action for corresponding Canadian Patent Application No. 2,899,245, dated Nov. 20, 2019.

* cited by examiner

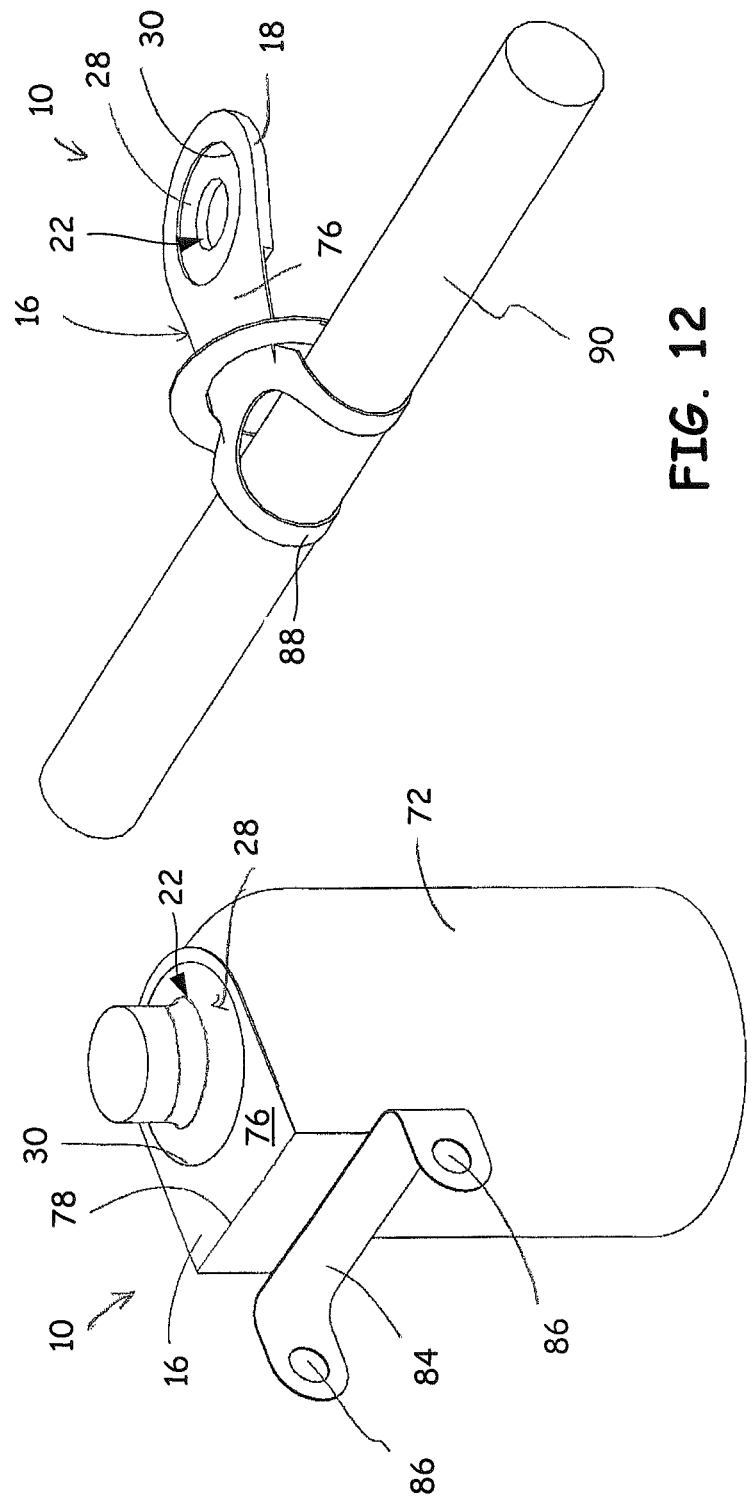

ARTICLE FOR BUNDLING ITEMS TOGETHER

CROSS-REFERENCE TO RELATED APPLICATION

This Application is a Section 371 National Stage Application of International Application No. PCT/US2014/023071, filed Mar. 11, 2014 and published as WO 2014/150367 A1 on Sep. 25, 2014, in English, the contents of which are hereby incorporated by reference in their entirety.

BACKGROUND

The present disclosure relates to a bundling article for collectively attaching items together, such as product items, for example. The present disclosure also describes methods for using the bundling article with objects, as well as methods for manufacturing exemplary bundling articles.

Examples of bundling articles are known. For example, two one-gallon jugs of milk can be connected with a handle that attaches to the necks of both jugs. However, such an article is generally designed to be used with two bottles or other items of similar height and size. When relatively rigid bundling articles are used with items of different sizes and shapes, the items tend to shift in special relation to each other. For example, the necks of the bottles may rotate relative to the bundling article. Such positional shifting may present issues when the items are placed on a shelf for a merchandise display, as the smaller item may cover important label information provided on the larger item. Alternatively or additionally, the smaller item may become oriented so that its label information is not presented to a viewer as desired, for example.

SUMMARY

In a first aspect, the present disclosure is directed to a bundling article that includes a panel defining a first panel opening (e.g., an aperture and/or slits) and a second panel opening (e.g., an aperture and/or slits), and at least one elastomer element. The at least one elastomer element includes at least one bonded portion that is bonded to the panel, a first inner portion, and a second inner portion. The first inner portion extends inward from the at least one bonded portion, is not bonded to the panel, and overlays the first panel opening and defines a first stretchable aperture having dimensions that are smaller than respective dimensions of the first panel opening. The second inner portion also extends inward from the at least one bonded portion, is also not bonded to the panel, and overlays the second panel opening and defines a second stretchable aperture having dimensions that are smaller than respective dimensions of the second panel opening.

In another aspect, the present disclosure is directed to a bundling article that includes a panel defining a first panel aperture and a second panel aperture, a first elastomer element, and a second elastomer element. The first elastomer element includes a first bonded portion bonded to the panel around the first panel aperture, and a first inner portion extending inward from the first bonded portion, where the first inner portion is not bonded to the panel, and where the first inner portion overlays the first panel aperture and defines a first stretchable aperture having dimensions that are smaller than respective dimensions of the first panel aperture. The second elastomer element includes a second bonded portion bonded to the panel around the second panel aperture, and a second inner portion extending inward from the second bonded portion, where the second inner portion is not bonded to the panel, and where the second inner portion overlays the second panel aperture and defines a second stretchable aperture having dimensions that are smaller than respective dimensions of the second panel aperture.

In a further aspect, the present disclosure is directed to a method of using a bundling article that includes a panel defining a first panel aperture and a second panel aperture, a first elastomer element, and a second elastomer element. The first elastomer element is bonded to the panel such that a portion of the first elastomer element overlays the first panel aperture, where the first elastomer element defines a first stretchable aperture. The second elastomer element is bonded to the panel such that a portion of the second elastomer element overlays the second panel aperture, where the second elastomer element defines a second stretchable aperture.

The method includes inserting a first item through the first panel aperture and the first stretchable aperture, which stretches the first stretchable aperture, and retaining the inserted first item in the first stretchable aperture by elastic tension of the first elastomer element. The method also includes inserting a second item through the second panel aperture and the second stretchable aperture, which stretches the second stretchable aperture, and retaining the inserted second item in the second stretchable aperture by elastic tension of the second elastomer element. In some embodiments, the first and second items have different sizes.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

DEFINITIONS

Unless otherwise specified, the following terms as used herein have the meanings provided below:

The terms "at least one" and "one or more of" an element are used interchangeably, and have the same meaning that includes a single element and a plurality of the elements, and may also be represented by the suffix "(s)" at the end of the element. For example, "at least one article", "one or more articles", and "article(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "providing", such as for "providing a consumable material", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 11 is a front perspective view of a fifth embodiment of a bundling article of the present disclosure attached to a bottle, and having the capacity for attachment to a second item.

FIG. 12 is a front perspective view of a sixth embodiment of a bundling article of the present disclosure, which has the capacity for attachment to two different types of items.

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure is directed to a unique bundling article that is configured to interconnect or "bundle" items (e.g., bottles or other products) together. As discussed below, the bundling article includes one or more elastomer elements bonded to an interconnecting panel (e.g., a printable panel), where each elastomer element includes a stretchable aperture for receiving and retaining one of the bundled items. The present disclosure is also directed to methods for manufacturing and using the bundling article, where the bundling article provides a convenient and efficient mechanism for handling, transporting, storing, displaying, and using the bundled items.

Figure 1:
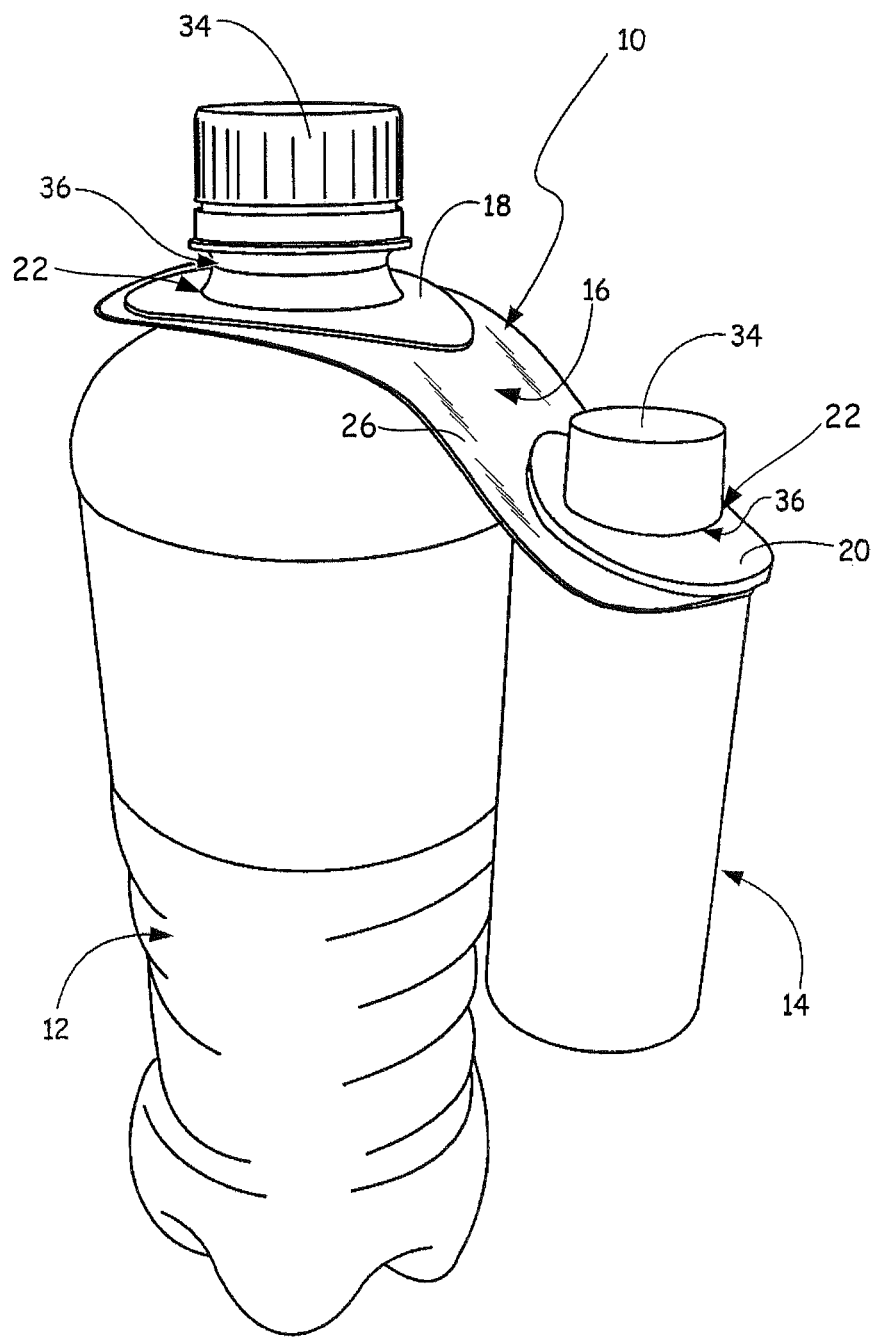
FIG. 1 is a side perspective view of a first exemplary embodiment of a bundling article of the present disclosure attached to two bottles.

FIG. 1 illustrates an example bundling article 10 of the present disclosure in use with a pair of items, referred to as bottles 12 and 14. As shown, bundling article 10 includes a panel 16 interconnecting a pair of elastomer elements 18 and 20. Elastomer elements 18 and 20 define first and second stretchable apertures 22 for respectively receiving and retaining bottles 12 and 14.

In the shown example, bottle 12 is larger than bottle 14, and preferably has sufficient weight and balance to prevent it from tipping over when bottle 14 is attached with bundling article 10. In this arrangement, bottle 14 is effectively suspended from bottle 12 by bundling article 10, which can be advantageous for many applications. For instance, bottle 14 may contain a sample of a related product (e.g., a sports drink mix) to the product retained in bottle 12 (e.g., water).

Panel 16 may be produced from any suitable sheet-based material, such as paper-based and/or polymeric materials, and may be a single-layer or multiple-layer sheet. In one preferred embodiment, as shown in FIG. 1, panel 16 is produced from a material that provides a visually transparent or translucent polymeric appearance, such as polyethylene terephthalate (PET) or polyethylene. In alternative embodiments, panel 16 may have an opaque appearance.

The material(s) for panel 16 are also preferably printable, such that indicia may be printed on panel 16 using any suitable ink or other printing composition. For instance, in some embodiments, panel 16 is produced from one or more paper-based materials suitable for receiving the printed indicia. Many paper-based materials are known for their compatibility with printing inks. However, the material for panel 16 is also preferably water resistant so as to not degrade or otherwise deform when exposed to water, and is also preferably tough enough to be sufficiently tear resistant to deter damage to it from customer handling.

In addition, the printed indicia, particularly any printed machine-readable information (e.g., a bar code), should be sufficiently water resistant to avoid degradation when repeatedly subjected to water and washing operations (e.g., as is common for produce displays in supermarkets). Accordingly, panel 16 produced from one or more paper-based materials may also include one or more polymeric layers configured to protect and reinforce the paper-based materials, and to protect any the printed indicia. For example, panel 16 may include a thin film of water-insoluble, transparent plastic disposed over the indicia to enhance water and wear resistance.

Alternatively, and more preferably, panel 16 is produced from one or more polymeric materials that may receive the printed indicia, and may be opaque, translucent, or transparent, as mentioned above. Suitable polymers for panel 16 include polystyrenic thermoplastics, polyolefinic thermoplastics (e.g., polyethylene and polypropylene), polyesters, copolymers thereof, blends thereof, and the like.

The polymeric material(s) may be formulated so that printing inks are readily accepted on panel 16, and/or panel 16 may be treated with special surface treatments to effect acceptance of printing inks. The surface treatment may enhance wettability and adhesion characteristics of panel 16 to printing inks. The polymeric material(s) of panel 16 also optionally include one or more compatible additives to achieve coloration, opacification, resistance to degradation on exposure to some environments, improved impact properties, improved adhesion properties, and the like.

Additionally, the material(s) for panel 16 are preferably flexible, but non-elastic, such that panel 16 itself may flex, but is substantially non-stretchable. This prevents the printed indicia on panel 16 from being distorted by the stretching. It cannot be emphasized enough that, in situations where reliable machine-readable information (e.g., UPC codes) is critical, panel 16 should be sufficiently non-elastic to avoid the risk of unscannable distortion for the machine-readable information. Furthermore, the material(s) for panel 16 are preferably resilient against tensile strains to allow panel 16 to carry items (e.g., bottles 12 and 14) having substantial weights.

In the shown example, panel 16 is provided as a sheet or film-like member that is substantially longer than it is wide to accommodate the bundling of bottles 12 and 14. Accordingly, panel 16 preferably has a length between stretchable apertures 22 that provides sufficient spacing for bottles 12 and 14. In other words, stretchable apertures 22 are preferably separated by a distance that is greater than the distance between the connection locations of the items, such as greater than the sum of the radii of bottles 12 and 14, more preferably greater than 105% of this sum, and in some embodiments, is greater than 110% of this sum.

The flexible characteristics of panel 16 allow panel 16 to bend and conform to the shape of bottle 12 under the carried weight of bottle 14. However, the non-stretchable characteristics of panel 16 prevent it from stretching under this carried weight. This allows bottles 12 and 14 to maintain their desired orientations and positions relative to each other.

Panel 16 may alternatively have any suitable dimensions, which may vary depending on the particular needs. For example, panel 16 may have dimensions and shapes that vary along its length, such as a sinusoidal pattern, widths that vary along the length (e.g., taper inward between elastomer elements 18, 20 for an hourglass configuration), individually-tailored designs (e.g., brand logos), and the like. Moreover, panel 16 may include cut-out holes with individually-tailored designs, if desired, to further provide information and aesthetic characteristics, and for providing hand grip holes, if desired.

Elastomer elements 18 and 20 each may be derived from one or more elastomeric materials capable of providing elastic characteristics. Suitable elastomeric materials for elastomer elements 18 and 20 include thermoplastic elastomers, such as styrenic block co-polymers (e.g., styrene-butadiene styrene and styrene-ethylene-butylene styrene), olefinic elastomers (e.g., ethylene and polypropylene based polyvinyl chloride-based elastomers, urethanes, nylon, silicon, and the like). The elastomeric materials provide elastomer elements 18 and 20 with sufficient elasticity such that stretchable apertures 22 may each be stretched from a relaxed state to a stretched state, and may contract back from its stretched state to its relaxed state (or any partially-retracted state therebetween).

Figure 2:
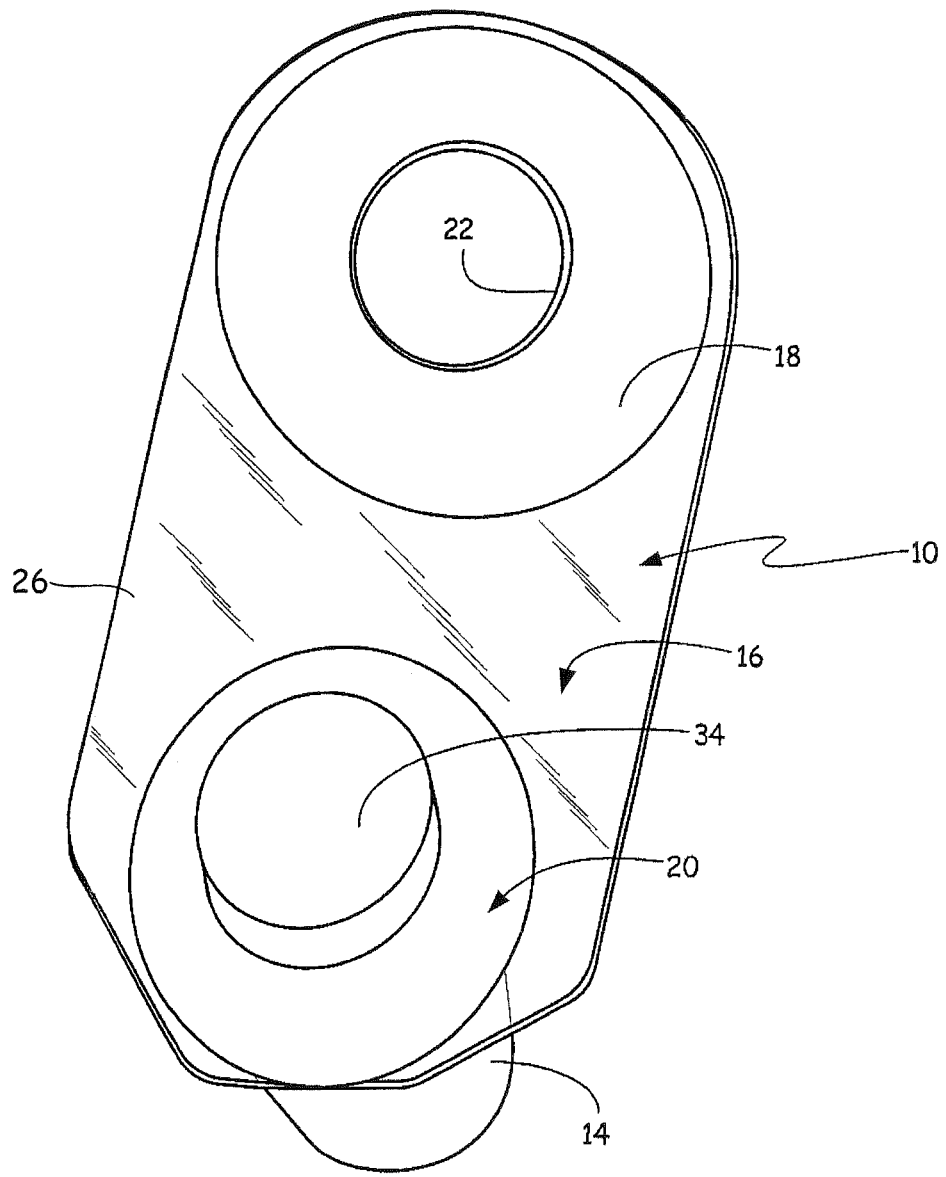
FIG. 2 is a top perspective view of the bundling article of FIG. 1, with the larger bottle removed therefrom.

FIG. 2 illustrates bundling article 10 with bottle 14, where bottle 12 has been removed from stretchable aperture 22 of elastomer element 18. This depicts stretchable aperture 22 of elastomer element 18 in its relaxed state. As further shown in FIG. 3, elastomer elements 18 and 20 each include a bond zone or bonded portion 24, where the elastomer element 18 or 20 is bonded to a top face of panel 16 (referred to as face 26, shown above in FIGS. 1 and 2). Elastomer elements 18 and 20 may be bonded to panel 16 at their respective bonded portions 24 using any suitable bonding technique, such as heat sealing, adhesive application, and the like. Additionally, elastomer elements 18 and 20 each include a non-bonded or inner portion 28 that extends inward from bonded portion 24, which is not bonded to panel 16, and defines the annular dimensions of stretchable aperture 22.

Correspondingly, panel 16 defines first and second panel apertures 30 at the locations of the elastomer elements 18 and 20, where each panel aperture 30 defines the demarcation between the bonded portion 24 and the inner portion 28 of the respective elastomer element 18 or 20. As shown, panel apertures 30 have dimensions (e.g., radii) that are larger than the respective dimensions of stretchable apertures 22, and are preferably larger than any item (e.g., bottles 12 and 14) that are intended to be received by stretchable apertures 22.

As such, each inner portion 28 overlays the respective panel aperture 30 such that stretchable aperture 22 and panel aperture 30 overlap. This prevents the non-stretchable material of panel 16 from inhibiting the stretching of apertures 22. Accordingly, because each stretchable aperture 22 of elastomer elements 18 and 20 is smaller than the corresponding panel aperture 30 of panel 16, the inner portions 28 of elastomer elements 18 and 20 retain the flexible characteristics of the elastomer materials, allowing stretchable apertures 22 to stretch and retract.

In the shown embodiment, stretchable apertures 22 and panel apertures 30 each have substantially circular cross sections. Additionally, in a preferred embodiment (as shown), each stretchable aperture 22 is also substantially concentric with its respective panel aperture 30.

While elastomer elements 18 and 20 are each illustrated as having annular geometries, in alternative embodiments, bonded portions 24 of one or both of elastomer elements 18 and 20 may include any suitable outer geometry (e.g., a square-shaped geometry or an artistically-shaped geometry). In effect, the geometries of elastomer elements 18 and 20 may cover any suitable areas of face 26 of panel 16 (referred to as areas 32, shown below in FIG. 5). In fact, as discussed below, in some embodiments, bundling article 10 may include a single elastomer element having the pair of stretchable apertures 22, where the single elastomer element extends across surface 26 of panel 16.

Additionally, stretchable apertures 22 may have different radii from each other to receive and retain items (e.g., bottles 12 and 14) of different sizes. Panel apertures 30 may correspondingly be sized to accommodate the different radii of stretchable apertures 22, such that boned portions 24 have sufficient surface areas to maintain good bonds, and such that inner portions 28 are sufficiently flexible to stretch apertures 22 to their expanded states.

Figure 3:
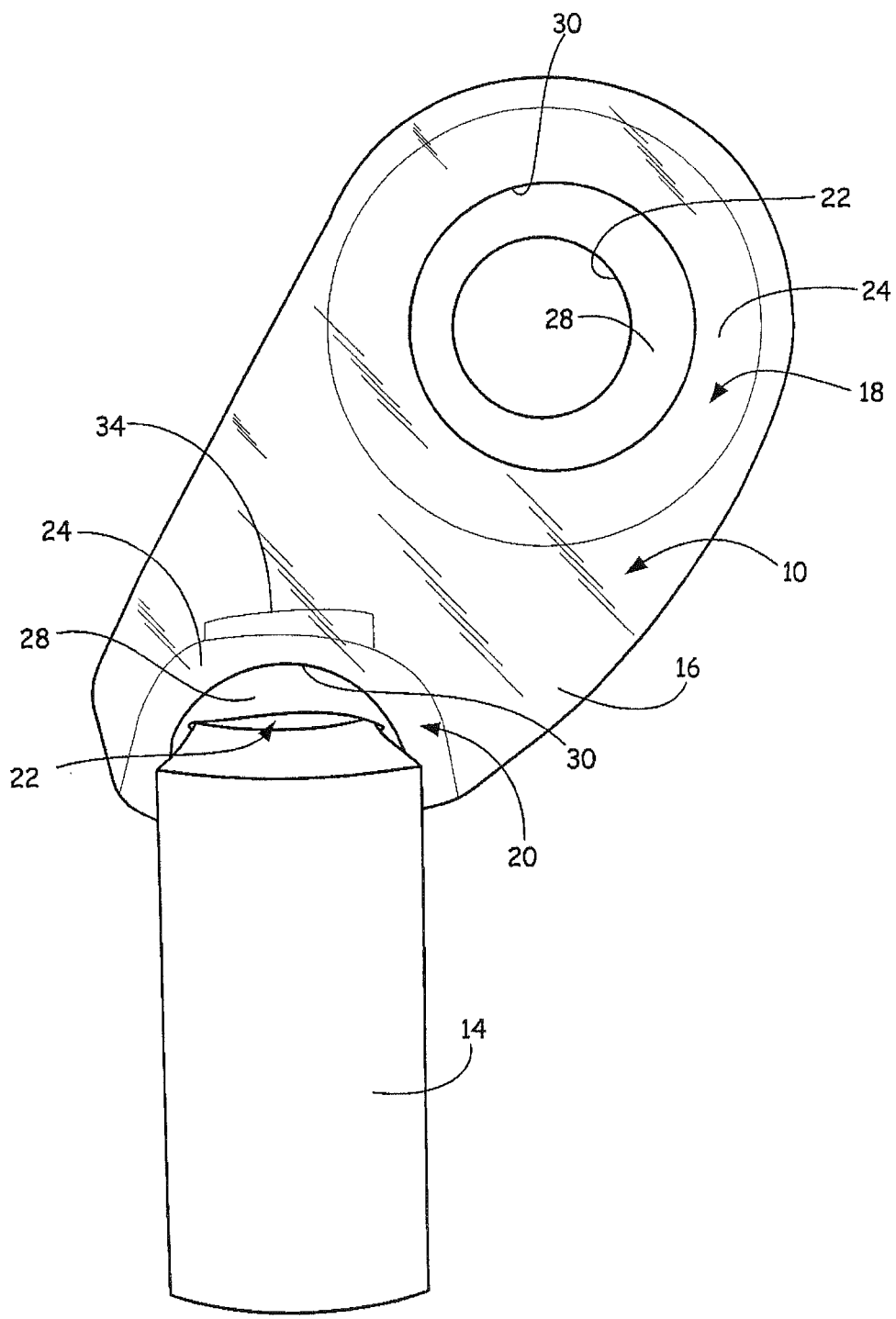
FIG. 3 is a partial bottom perspective view of the bundling article of FIGS. 1 and 2, with the larger bottle removed therefrom.
Figure 4:
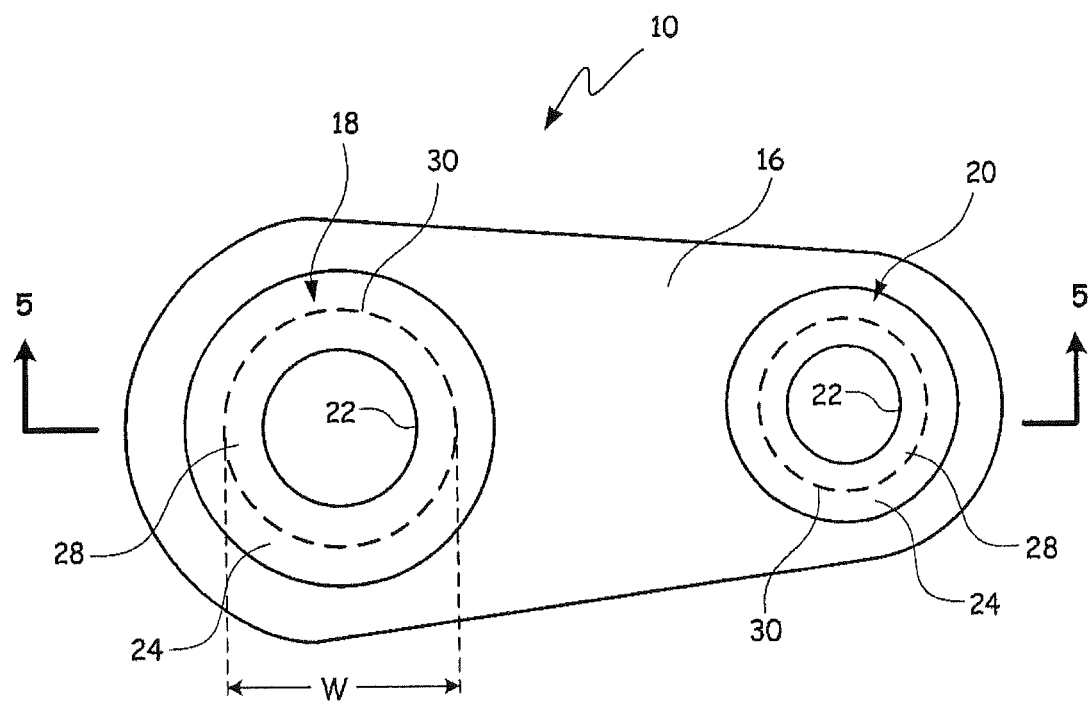
FIG. 4 is a top plan view of the exemplary bundling article of FIGS. 1-3.
Figure 5:
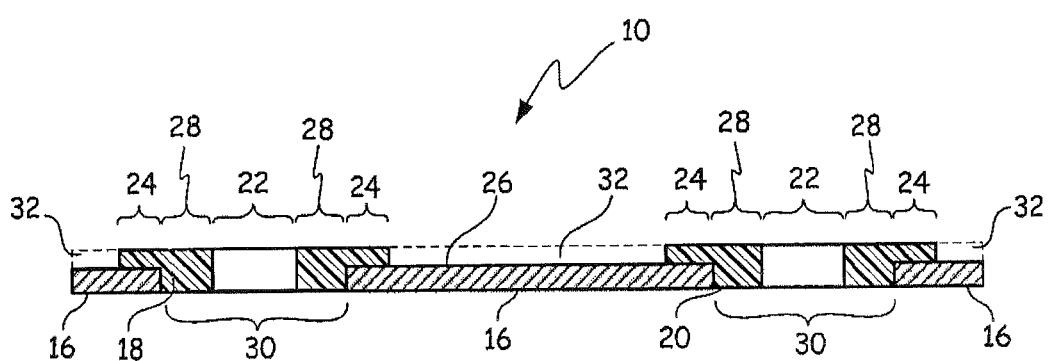
FIG. 5 is a sectional view of the bundling article, taken along line 5-5 of FIG. 4.

Thus, inner portions 28 preferably have sufficient flexibilities and stretchabilities to be pushed past items, such as caps 34 of bottles 12 and 14 that are larger than the dimensions of stretchable apertures 22 (caps 34 are shown in FIGS. 1-3). However, as shown in FIGS. 4 and 5, because of the non-stretchable material of panel 16 at panel apertures 30, a width dimension W of each inner portion 28 does not increase past the radius of the corresponding panel aperture 30.

Moreover, inner portions 28 preferably have sufficient strengths to grip, and be retained snugly around, necks 36 of bottles 12 and 14 (necks 36 are shown above in FIG. 1). This retains bottles 12 and 14 under elastic tension of elastomer elements 18 and 20. To preserve the strength of each inner portion 28, inner portions 28 of elastomer elements 18 and 20 are each preferably continuous without any radial slit or other opening in the inner diameter or annulus defining stretchable aperture 22.

The strength of the retention between bundling article 10 and bottles 12 and 14 can also be affected by selectively choosing the elastomer materials for elastomer elements 18 and 20 based on durometer or thickness of the materials, selectively choosing the size and/or configuration of stretchable aperture 22, and/or selectively choosing the size of inner portion 28 in relation to the dimensions of the intended items (e.g., bottles 12 and 14). In some cases, a gentler grip between bundling article 10 and bottles 12 and 14 is desired to make it easier to separate bundling article 10 from bottles 12 and 14. In other applications, it may be more desirable to have a more permanent retention between bundling article 10 and bottles 12 and 14 to prevent shifting of the bottles 12 and 14 relative to bundling article 10 during handling, storage, shipping, display, or use.

During use, cap 34 and neck 36 of bottle 12 may be inserted through stretchable aperture 22 of elastomer element 18 and the respective panel aperture 30. The dimensions of cap 34 and neck 36, which are preferably larger than the dimensions of stretchable aperture 22 and smaller than the dimensions of panel aperture 30, stretch inner portion 28 of elastomer element 18 to an expanded state. When cap 34 passes beyond stretchable aperture 22, the elastomer material of inner portion 28 allows inner portion 28 to partially retract back to its relaxed state to fit snugly around neck 36 of bottle 12 under elastic tension. In comparison, because of the larger dimensions of panel aperture 30 and the non-stretchable material of panel 16, panel aperture 30 does not stretch.

A similar process may be performed with bottle 14 and elastomer element 20 to retain bottles 12 and 14 at desired positional orientations with respect to each other, such as shown in FIG. 1. When bottles 12 and 14 are retained as such, the product labels of bottles 12 and 14 may be prominently visible to a viewer. This is especially desirable for a merchandise display, where a visual effect of all of the product labels of bottles 12 and 14 (or other product items) on a shelf can be retained as desired (e.g., facing in the same direction).

Figure 6A:
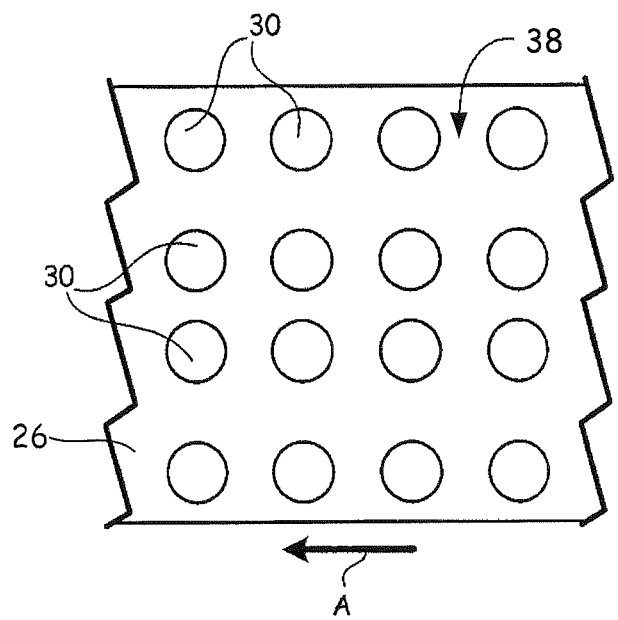
FIGS. 6A-6C are partial, schematic top views of a web assembly, illustrating a process for manufacturing the bundling article of FIGS. 1-5.
Figure 6B:
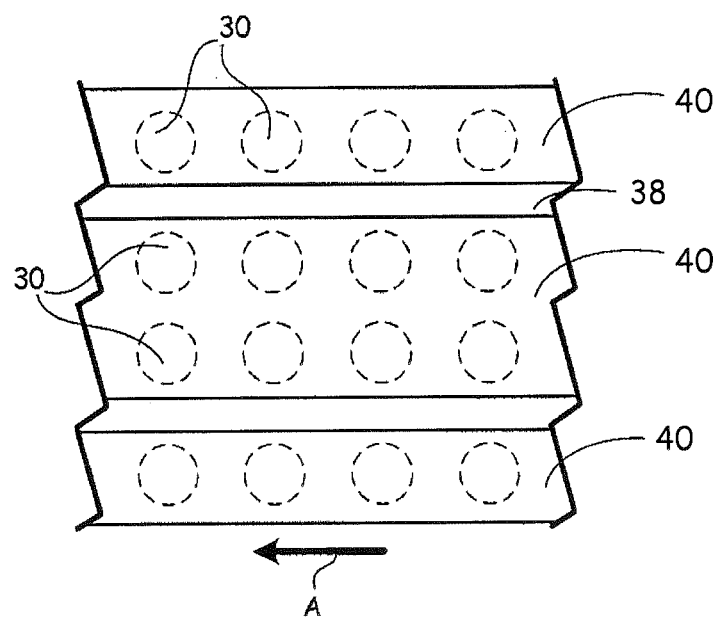
Figure 6C:
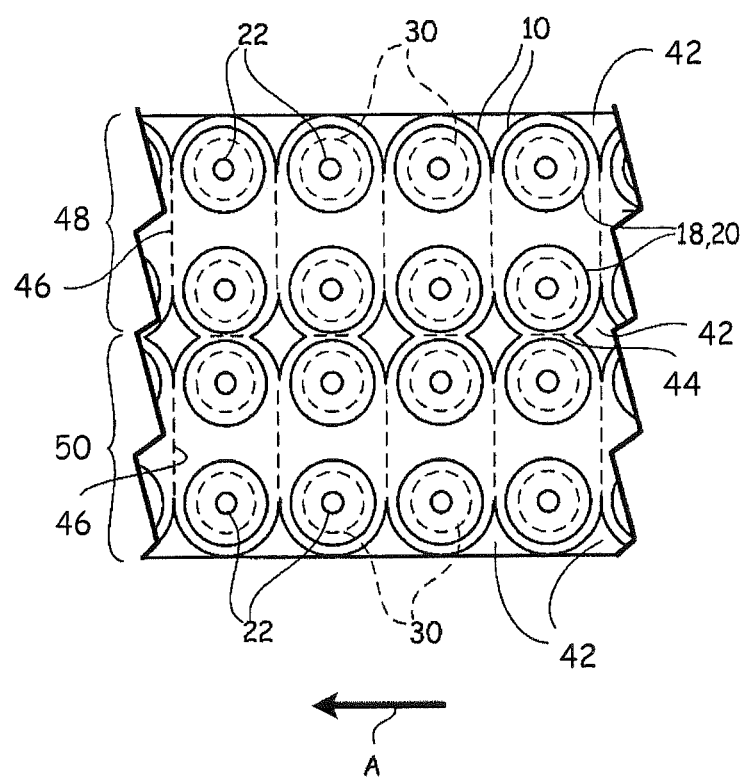

The bundling article 10 shown in FIGS. 1-5 may be manufactured using a web-based process, such as shown in FIGS. 6A-6C. As shown in FIG. 6A, the process may initially involve advancing a web of the material for panel 16, referred to as panel web 38, in a direction A. At this point, panel web 38 may be unprinted or pre-printed, or may be printed in-line as a step in the bundling article manufacturing process. Initially, face 26 may be surface treated in the intended regions of bonded portions 24 for the bundling articles 10, such as with a bond-promoting coating. Optionally, a masking material (e.g., silicone) may be applied to face 26 at the areas outside of the intended regions of bonded portions 24.

While advancing in the direction A, panel web 38 may reach an aperture cutting station, which cuts panel apertures 30 into panel web 38, such as with a rotary die cutter. The cut out portions of panel web 38 for panel apertures 30 may be collected and recycled.

As shown in FIG. 6B, as panel web 38 continues to advance in direction A, it may reach an elastomer extrusion station, which extrudes the elastomer material for elastomer elements 18 and 20 onto panel web to provide elastomer layers 40. In this case, elastomer layers 40 are three strips that overlay or otherwise cover panel apertures 30.

As shown in FIG. 6C, as panel web 38 continues to advance in direction A, it may reach one or more additional die cutting stations, which (i) selectively cut elastomer apertures 22 into elastomer layers 40; (ii) selectively kiss-cut and remove excess portions of elastomer layers 40 to define the outer geometries of elastomer elements 18 and 20, (iii) selectively cut panel web 38 to define the outer dimensions of panels 16, thereby producing excess weed 42; and (iv) selectively form perforations at ends 44 and side edges 46 of each bundling article 10. The excess materials cut from the web assembly (e.g., weed 42) may be collected and recycled.

As further shown in FIG. 6C, bundling articles 10 are provided in two rows arranged so that first row 48 is a mirror image of second row 50. Ends 44 and side edges 46 are illustrated as boundaries for bundling articles 10, wherein each bundling article 10 comprises a pair of elastomer elements 18 and 20 (each having an stretchable aperture 22). However, as mentioned above, ends 44 and side edges 46 may be selectively positioned as boundaries for a bundling article including any number of elastomer elements and apertures. For example, ends 44 and side edges 46 may surround a group of six elastomer elements to group six items (not shown) together. Moreover, panel web 38 may be provided with slits to allow a user to pull up a strip of material of panel 16 for use as a handle for the multi-item bundling article (e.g., as a "six-pack" carrier).

In some embodiments, the back side of panel web 38 may include an adhesive backing provided on a release liner. In this case, adjacent bundling articles 10 may be cut such that they are fully separated from each other for ease of removal from the release liner. After the cutting steps, the resulting web assemblies may be rolled onto spools or provided in sheet form. During use, each bundling article 10 may be separated from the roll or sheet, and used to bundle items, such as bottles 12 and 14, together for handling, storage, shipping, and display.

In some preferred embodiments, the bundling articles 10 may be retained as in roll form wound on a spool or core, where the individual bundling articles 10 are separable by perforations as ends 44 and side edges 46. In this case, the spool or core with the wound roll may be loaded to an application machine and use in an automated process. During the automated process, individual bundling articles 10 may be separated from the roll form by tearing the perforations, and the separated bundling articles 10 may be applied to items (e.g., bottles 12 and 14), as discussed above.

Bundling article 10 is particularly suitable with the arrangement shown in FIGS. 1-5, having two elastomer elements 18 and 20, each having single stretchable aperture 22. In alternative embodiments, however, bundling article 10 may include a single elastomer element, or three or more elastomer elements with corresponding stretchable apertures 22. Moreover, each elastomer element may include one stretchable aperture 22, or may include multiple stretchable apertures 22.

Figure 7:
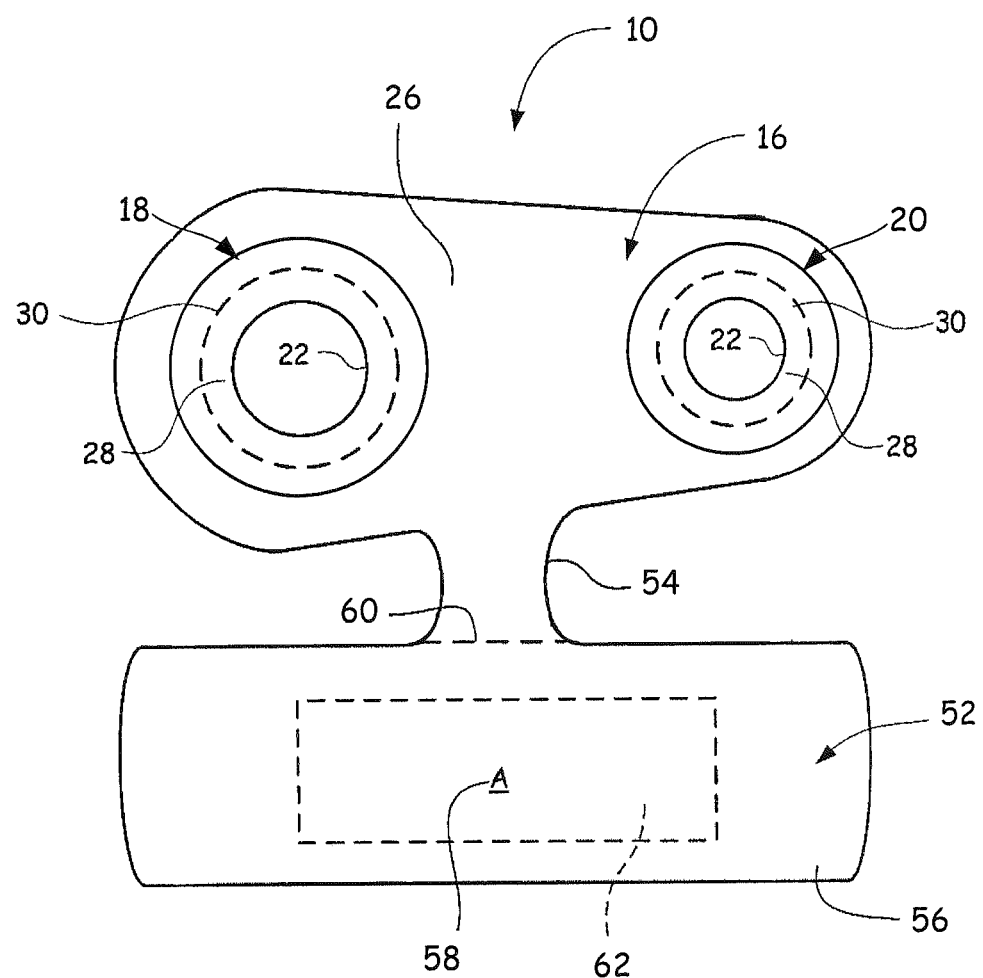
FIG. 7 is a top plan view of a second embodiment of a bundling article of the present disclosure, which includes a tag portion.

FIG. 7 illustrates an alternative bundling article 10, which also includes tag portion 52 integrally formed with panel 16, and extending laterally from panel 16 via connecting neck 54. Suitable materials for tag portion 52 include those discussed above for panel 16, where panel 16 and tag portion 52 may be derived from the same or different materials. As shown, tag portion 52 includes face 56, which may include indicia 58 to convey information, such as promotional information about the items to be retained by bundling article 10.

While tag portion 52 is illustrated as having a general rectangular geometry, in alternative embodiments, tag portion 52 may have any desired geometry, such as standard geometric shapes (e.g., squares, triangles, etc . . . ), artistic and/or logo-based shapes, and the like. Furthermore, tag portion 52 may extend in any direction from panel 16, and in some embodiments, multiple tag portions 52 may extend from panel 16.

A line of weakness such as perforation or score line 60 may optionally be included at connecting neck 54 for ease of orientation (e.g., bending) of tag portion 52 relative to panel 16 (either up or down). Line 60 may also optionally allow for ease of detachment of tag portion 52, such as where tag portion 52 may function as a coupon.

Moreover, in some embodiments, other features may be attached to tag portion 52, such as, for example, a magnet 62 on a back surface of tag portion 52, opposite of face 56, where, upon removal, tag portion 52 may serve a refrigerator magnet. In yet another embodiment, a layer of adhesive may be provided on face 56 so that a separate product, such as a sample packet, may be adhered to face 56 of tag portion 52. Alternatively, such a layer of adhesive may be disposed on a back surface of tag portion 52. The layer of adhesive may be covered with a release liner that may be removed to expose the adhesive for use (e.g., for use in adhering tag portion 52 to an item being engaged by bundling article 10, to a product sample, or for use by a consumer to adhere tag portion 52 to another surface).

The bundling article 10 shown in FIG. 7 may be manufactured in a similar manner to the embodiment shown in FIGS. 1-5. For instance, the web-based process shown in FIGS. 6A-6C may be modified to accommodate tag portion 52. Alternatively, the bundling article 10 shown in FIG. 7 may be produced using a web-based process similar to that shown below in FIGS. 9A-9D.

Figure 8:
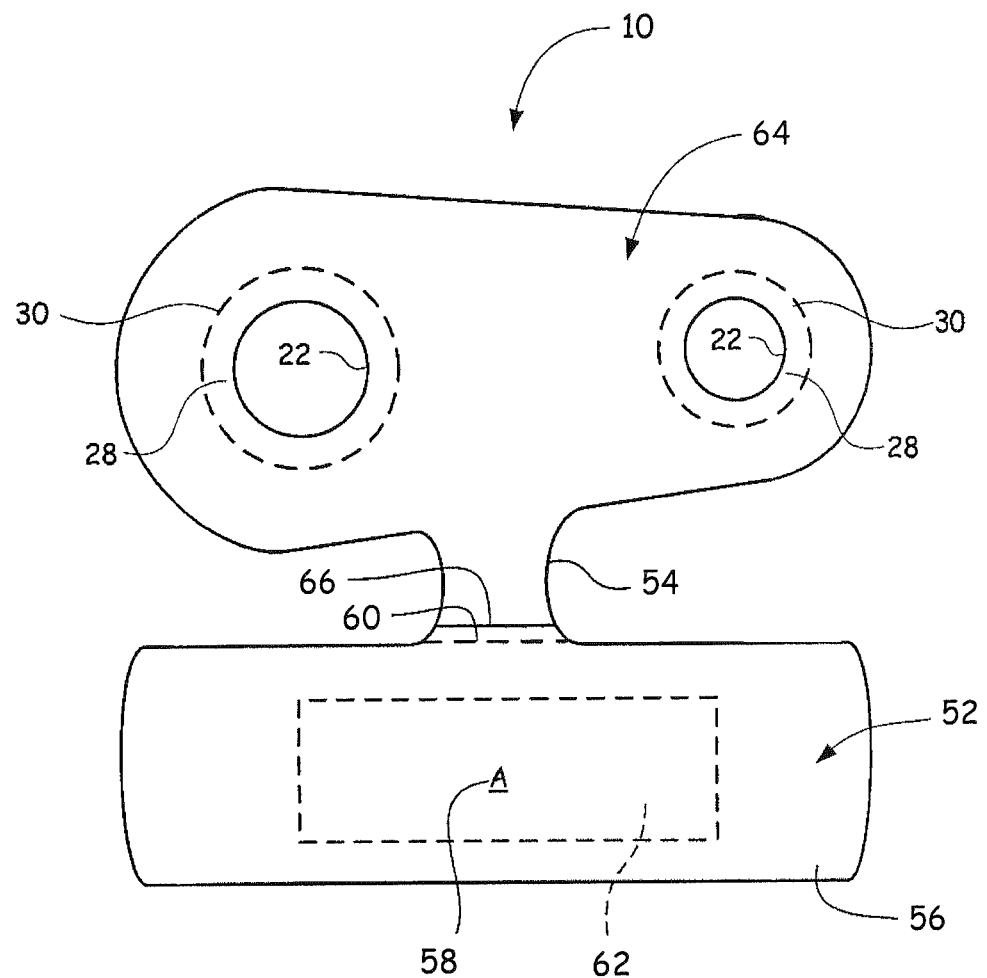
FIG. 8 is a top plan view of a third embodiment of a bundling article of the present disclosure, which includes a tag portion and a single extended elastomer element.

FIG. 8 illustrates yet another alternative bundling article 10, similar to the embodiment shown in FIG. 7, where a single elastomer element 64 covers panel 16 and encompasses both apertures 22 (as opposed to a pair of elastomer elements 18 and 20). As further shown, elastomer element 64 may also extend down into connecting neck 54 to define elastomer edge 66.

As can be seen, the embodied bundling articles 10 of the present disclosure may include at least one elastomer element having at least one bonded portion that is bonded to panel 16, and first and second inner portions that are not bonded to panel 16. In the embodiments shown in FIGS. 1-5 and 7, the at least one elastomer element includes the first and second elastomer elements 18 and 20, which respectively have the first and second bonded portions 24, and the first and second non-bonded or inner portions 28 that overlay panel apertures 30. Alternatively, in the embodiment shown in FIG. 8, the at least one elastomer element includes a single elastomer element having a single bonded portion extending across panel 16, and the first and second non-bonded or inner portions 28 that overlay panel apertures 30.

Figure 9A:
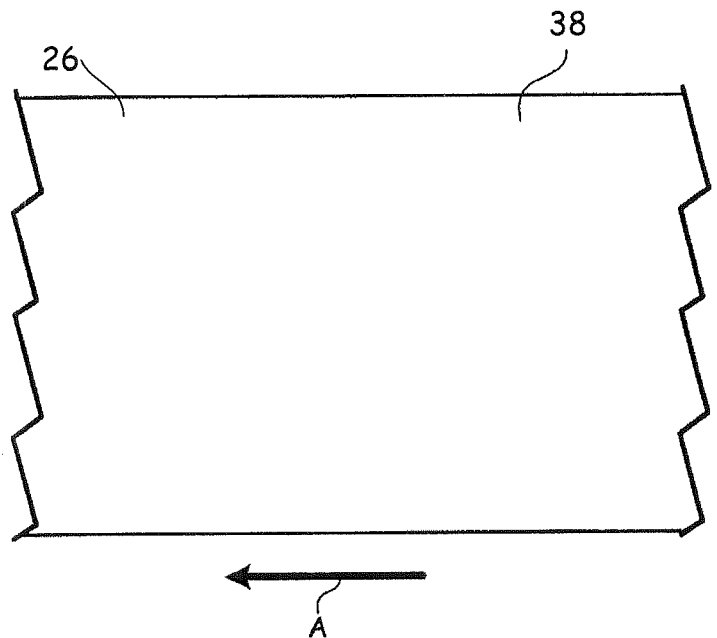
FIGS. 9A-9D are partial, schematic top views of a web assembly, illustrating a process for manufacturing the bundling article of FIG. 8.

Bundling article 10 of the embodiment shown in FIG. 8 may also be manufactured using a web-based process, such as shown in FIGS. 9A-9D. As shown in FIG. 9A, the process may initially involve advancing a web of the material for panel 16, referred to again as panel web 38, in a direction A. At this point, panel web 38 may be unprinted or pre-printed, or may be printed in-line as a step in the bundling article manufacturing process. Initially, panel web 38 may be surface treated at the intended locations of faces 26 for panels 16, such as with a bond-promoting coating.

Figure 9B:
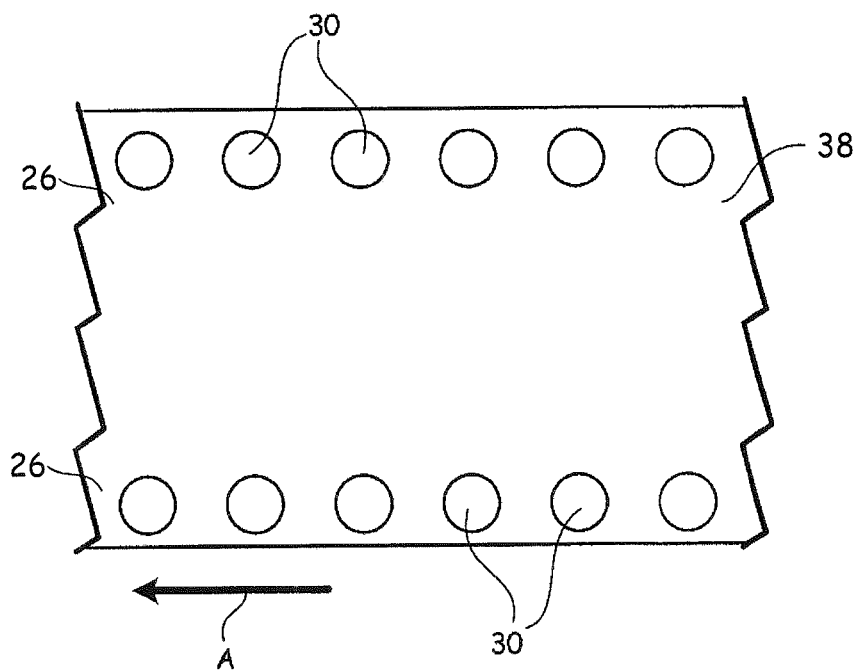

As shown in FIG. 9B, while advancing in the direction A, panel web 38 may reach an aperture cutting station, which cuts panel apertures 30 into panel web 38, such as with a rotary die cutter. The cut out portions of panel web 38 for panel apertures 30 may be collected and recycled.

Figure 9C:
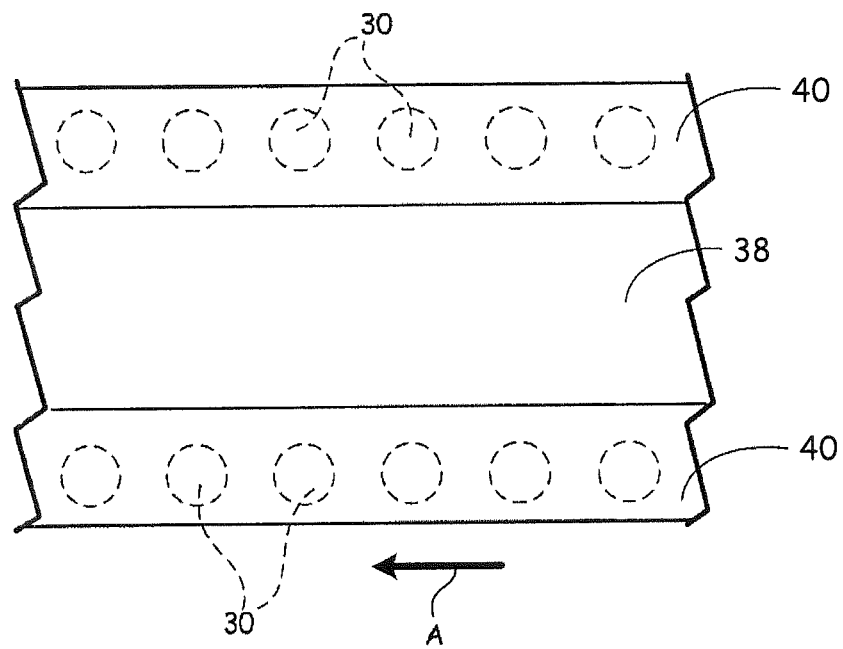

As shown in FIG. 9C, as panel web 38 continues to advance in direction A, it may reach an elastomer extrusion station, which extrudes the elastomer material for elastomer elements 64 onto panel web to provide elastomer layers 40. In this case, elastomer layers 40 are two strips that overlay or otherwise cover panel apertures 30.

Figure 9D:
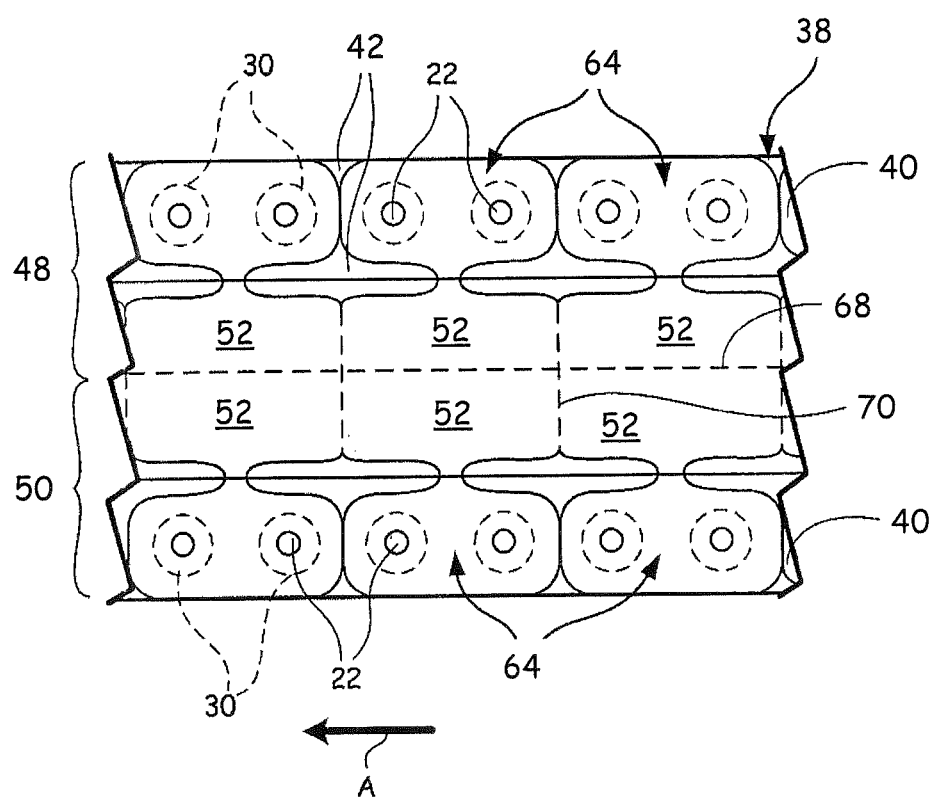

As shown in FIG. 9D, as panel web 38 continues to advance in direction A, it may reach one or more additional die cutting stations, which (i) selectively cut apertures 22 into elastomer layers 40; (ii) selectively kiss-cut and remove excess portions of elastomer layers 40 to define the outer geometries of elastomer elements 64, (iii) selectively cut panel web 38 to define the outer dimensions of panels 16, tag portions 52, and connecting necks 54, thereby producing excess weed 42; and (iv) selectively form perforations at tag ends 68 and side edges 70 of each bundling article 10. The excess materials cut from the web assembly (e.g., weed 42) may be collected and recycled.

Figure 10B:
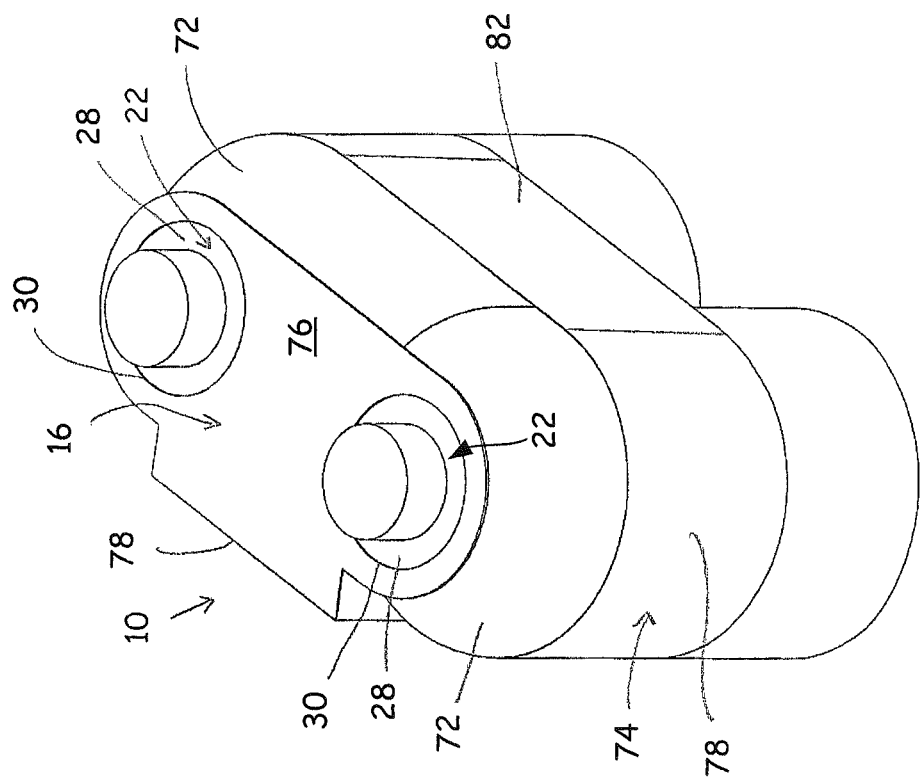
FIG. 10B is a rear perspective view of the bundling article of FIG. 10A attached to the two bottles.
Figure 10A:
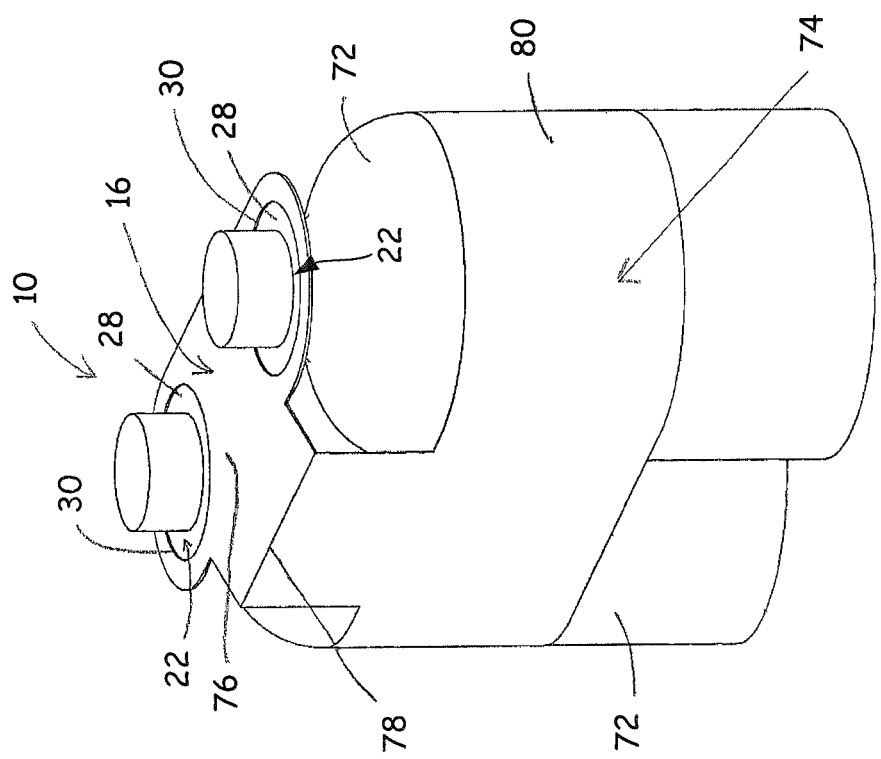
FIG. 10A is a front perspective view of a fourth embodiment of a bundling article of the present disclosure attached to two bottles, where the bundling article of this embodiment includes a band.
Figure 13:
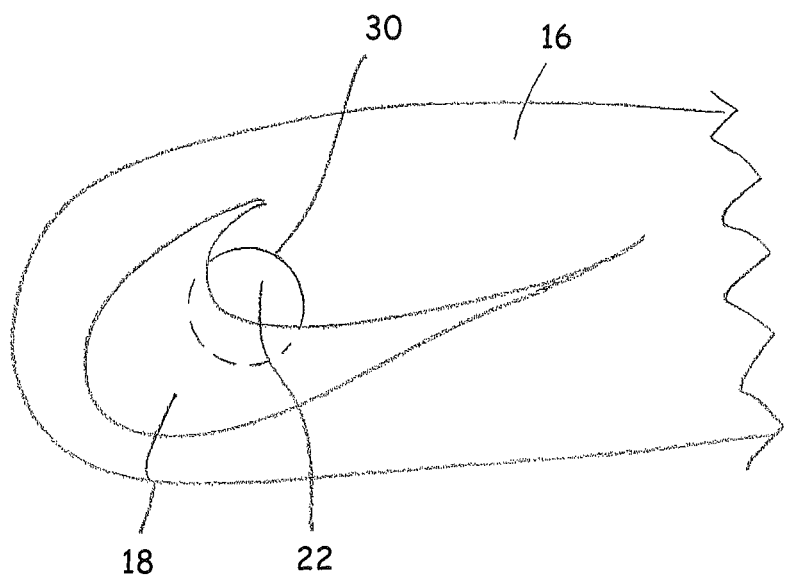
FIGS. 13-20 are partial top views of panels of the embodied bundling articles of the present disclosure, each having a stretchable aperture and different configurations of elastomer elements.
Figure 14:
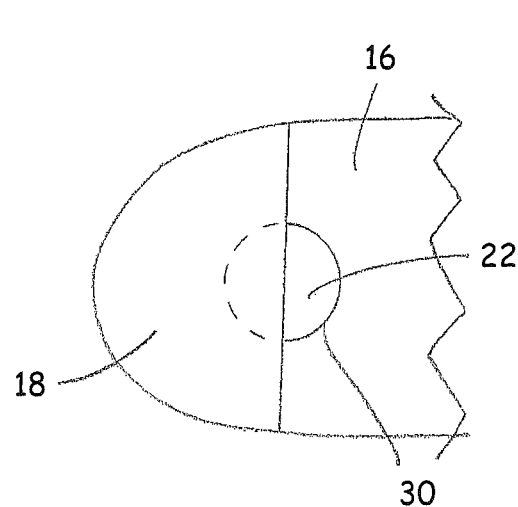
Figure 15:
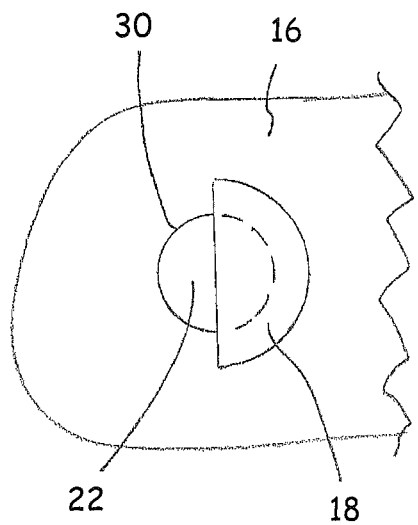
Figure 16:
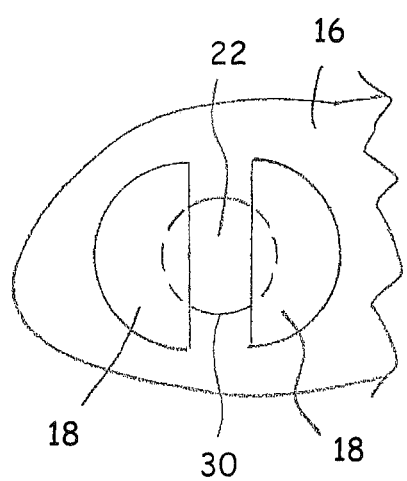
Figure 17:
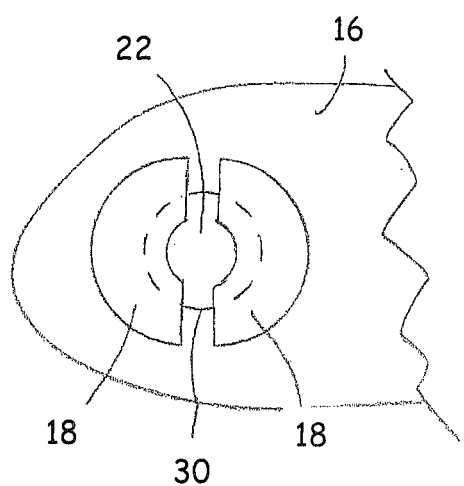
Figure 18:
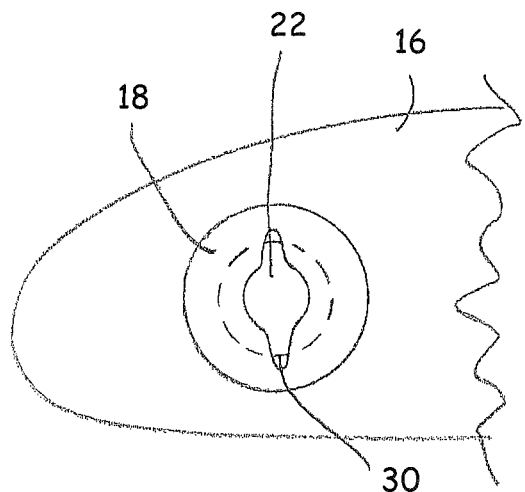
Figure 19:
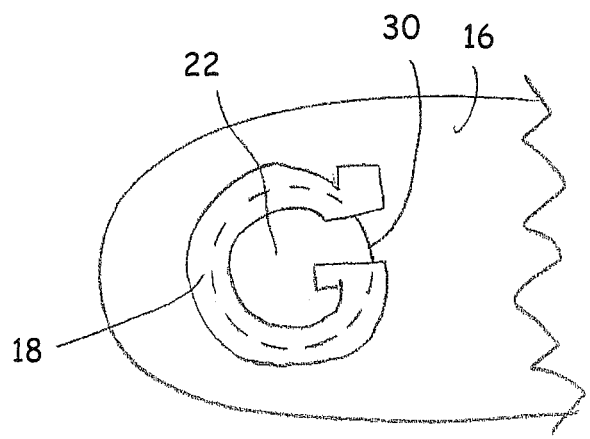
Figure 20:
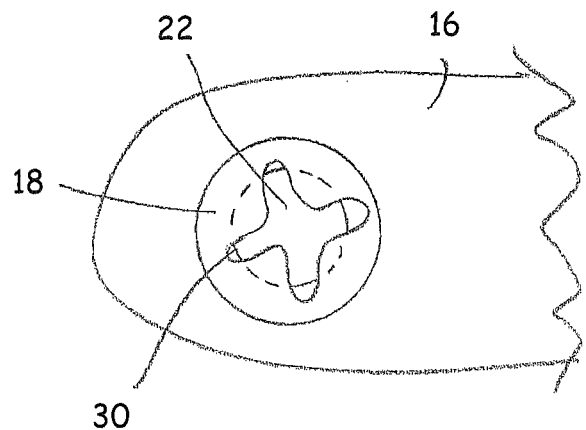

FIGS. 10A and 10B illustrate another alternative bundling article 10 for use with two similarly-sized items, such as bottles 72. In this embodiment, bundling article 10 is similar to the embodiment shown in FIG. 8, where tag portion 52 is replaced with band 74 that extends from panel 16, and is configured to wrap around the two bottles 72. As shown in FIG. 10A, panel 16 may be oriented upside down compared to the embodiments shown in FIGS. 1-5, 7, and 8. As such, elastomer element 64 is located on the underlying side, and the opposing face 76 of panel 16 faces upward. In some embodiments, band 74 includes a perforation or score line 78 to facilitate a fold thereon.

As further shown in FIG. 10B, in an exemplary embodiment, band 74 includes a banner area 80 and an elastomer portion 82. In a typical use, the banner area 80 wraps around a front and sides of the bundled bottles 72 and may include printing or other indicia. The elastomer portion 82 is disposed on a back side of band 74 and assists in retaining band 74 snuggly on bottles 72 under elastic tension. An elastomer material used for elastomer portion 82 may include the elastomer materials discussed above for elastomer elements 18, 20, and 64.

FIG. 11 illustrates another alternative bundling article 10 retaining a single bottle 72, and having the capacity for attachment to a second item. In particular, a second elastomer portion 84 may be bonded to panel 16 to extend laterally from panel 16. As shown, elastomer portion 84 may include apertures 86 or other suitable retention mechanisms for retaining sample items. For instance, a tubular sample item, such as a rolled-up coupon may be inserted through apertures 86.

An elastomer material used for elastomer portion 84 may include the elastomer materials discussed above for elastomer elements 18, 20, and 64. Because of the ability of apertures 86 to stretch, elastomer portion 84 may accommodate and grip sample items of a variety of sizes.

FIG. 12 illustrates yet another alternative bundling article 10 for retaining a single item in stretchable aperture 22, and having the capacity for attachment to a second and different type of item, if desired. In this embodiment, elastic loop 88 is bonded to the opposing end of panel 16 from elastomer element 18. A suitable flexible elastic fastening loop is described in commonly assigned U.S. Pat. No. 8,011,127. As further shown, an item, such as rod 90, may be attached to bundling article 10 of this embodiment by looping elastic loop 88 around rod 90 and onto panel 16. Because of the ability of elastic loop 88 to stretch, it can also accommodate and grip items of a variety of sizes and shapes.

As discussed above, the embodied bundling articles 10 of the present disclosure may have a variety of different configurations of panels, apertures, and elastomer elements. FIGS. 13-20 illustrate just a few partial top views of panels 16, each having a circular panel aperture 30 and different configurations of elastomer elements 18, thereby resulting in different configurations for stretchable apertures 22 that are not overlaid by the elastomer elements 18. It is contemplated that even more variations are possible by changing the configuration of the aperture in the panel to a configuration other than a circular panel aperture 30.

Figure 21:
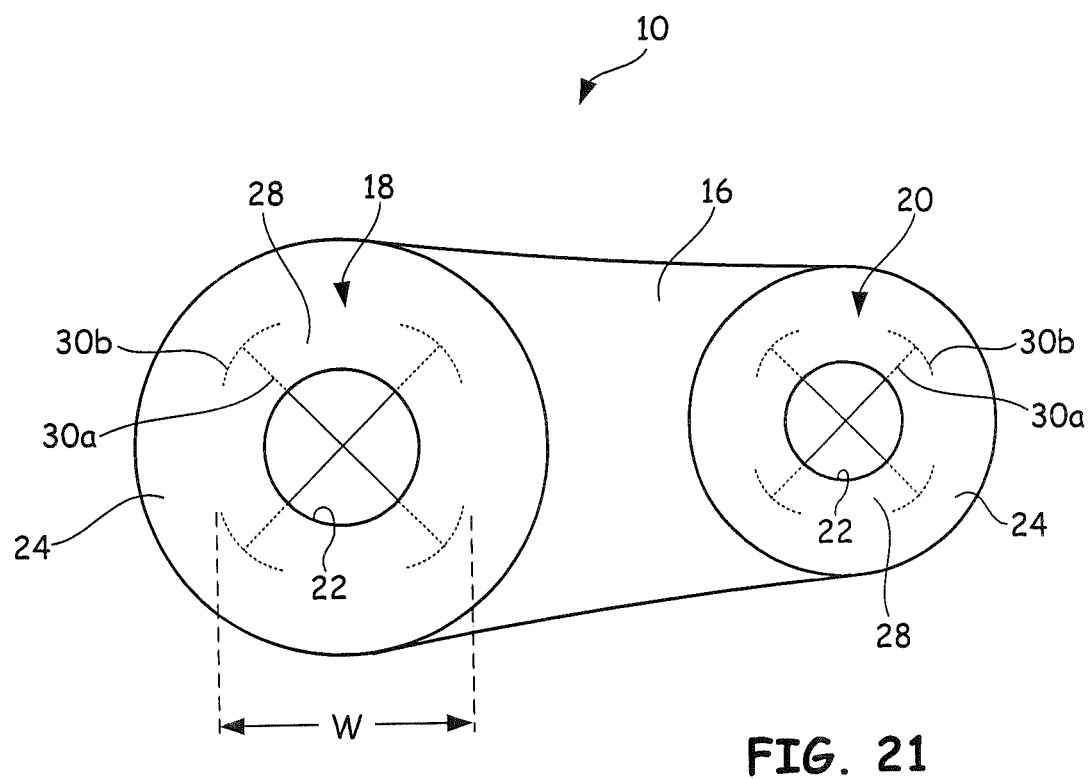
FIG. 21 is a top plan view of a seventh alternative embodiment of a bundling article of the present disclosure, which includes panel slits.

FIG. 21 illustrates yet another alternative bundling article 10, which includes panel slits 30*a* and 30*b* in lieu of panel apertures 30. As shown, at elastomer element 18, panel 16 includes four panel slits 30*a* extending in a cross-pattern, with panel slits 30*b* extending from the terminus of each panel slit 30*a* in an arced arrangement. A similar arrangement is shown at elastomer element 20. In alternative embodiments, panel 16 may include any suitable number of panel slits 30*a* and 30*b* at each of elastomer elements 18 and 20.

Panel slits 30*a* and 30*b* may function in a similar manner to panel apertures 30, where items may be inserted through each of panel slits 30*a* and stretchable apertures 22. However, in this embodiment, panel slits 30*a* may further assist in restraining the items in stretchable apertures 22. Stretchable apertures 22 may be stretched and relaxed to retain items under elastic tension as discussed above, where the dimensions of panel slits 30*b* effectively function as the perimeters of panel apertures 30 (shown above in FIGS. 1-5). As such, elastomer portions 18 and 20 each include inner portion 28 that extends inward from bonded portion 24 in the same manner as discussed above. This accordingly limits the stretching of stretchable apertures 22, as discussed above, while also allowing panel slits 30*a* to mechanically retain the inserted items.

While illustrated with particular sizes, the dimensions of panel slits 30*a* and 30*b* may alternatively be varied to accommodate the sizes of variety of different items. This embodiment may also be combined with any of the above-shown embodiments. For instance, bundling article 10 of this embodiment may also include tag portion 52 (e.g., as shown in FIGS. 7 and 8).

Bundling article 10 of this embodiment may be manufactured in the same manner as the embodiment shown above in FIGS. 1-6C, where panel slits 30*a* and 30*b* are cut in the web prior to applying the elastomer material. One processing advantage of this embodiment is that the cores of panel 16, would otherwise be removed if panel apertures 30 were cut out, are no longer present. As such, removal and collection of the panel cores is omitted.

Accordingly, panel 16 may be cut with a variety of different panel openings, such as panel apertures 30 and/or panel slits 30*a* and 30*b*. In some embodiments, one end of panel 16 may include a panel aperture 30, and the other end may include panel slits 30*a* and 30*b*. As used herein, the term "panel opening" may refer a panel aperture (e.g., panel aperture 30) and panel slits (e.g., panel slits 30*a* and 30*b*).

U.S. Pat. Nos. 7,281,345; 7,836,622; and 8,011,127; U.S. Provisional Patent Application No. 61/784,458; and International Publication No. WO2007/084119 are each incorporated by reference in their entireties to the extent that they do not conflict with the present disclosure. Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

The invention claimed is:

1. A bundling article including:
   a panel of a flexible sheet material defining a first panel opening;
   a first elastomer element including:
   at least one bonded portion that is cohered to the panel; and
   a first inner portion extending inward from the at least one bonded portion, wherein the first inner portion is not bonded to the panel, and wherein the first inner portion overlays the first panel opening and defines a first aperture having dimensions that are smaller than respective dimensions of the first panel opening; and
   a second elastomer element including:
   at least one bonded portion that is cohered to the panel; and
   a second aperture.

2. The bundling article of claim 1, wherein the second elastomer element is separate from the first elastomer element.

3. The bundling article of claim 1, wherein the first elastomer element has an annular geometry.

4. The bundling article of claim 1, wherein the first panel opening has a substantially circular cross-section.

5. The bundling article of claim 1, wherein the first panel opening and the first aperture are substantially concentric.

6. The bundling article of claim 1, wherein the panel is substantially non-stretchable.

7. The bundling article of claim 1, and further including a tag portion extending from the panel.

8. The bundling article of claim 1, and further including a band extending from the panel.

9. The bundling article of claim 1, wherein the first aperture has a substantially circular cross-section, and wherein the first inner portion is continuous without any radial slits.

10. A method of using a bundling article, the method including:
    providing the bundling article including:
    a panel of a flexible sheet material defining a first panel opening;
    a first elastomer element cohered to the panel such that a portion of the first elastomer element overlays the first panel opening, wherein the first elastomer element defines a first aperture; and a second elastomer element cohered to the panel and having a second aperture;

inserting a first item through the first panel opening and the first aperture, which enlarges the first aperture;

retaining the inserted first item in the first aperture by elastic tension of the first elastomer element;

attaching a second item at the second elastomer element; and retaining the attached second item at the second elastomer element by elastic tension of the second elastomer element.

11. The method of claim 10, wherein providing the bundling article includes separating the bundling article from a roll of multiple bundling articles.

12. The method of claim 10, and further including suspending a tag portion of the bundling article from the panel.

13. The method of claim 10, and further including:
suspending a band of the bundling article from the panel; and
wrapping the band around the first item and the second item.

14. The method of claim 10, wherein attaching the second item at the second elastomer element includes wrapping at least a portion of the second elastomer element around the second item.

15. The method of claim 10, wherein attaching the second item at the second elastomer element includes inserting at least a portion of the second item into the second aperture.

* * * * *